US008470271B2

(12) United States Patent
Seetharaman et al.

(10) Patent No.: US 8,470,271 B2
(45) Date of Patent: Jun. 25, 2013

(54) PROCESS FOR CHLORINATING RESOURCES CONTAINING RECOVERABLE METALS

(75) Inventors: Seshadri Seetharaman, Täby (SE); Olle Grinder, Vällingby (SE)

(73) Assignee: Salt Extraction Aktiebolag, Stockholm (SE)

( * ) Notice: Subject to any disclaimer, the term of this patent is extended or adjusted under 35 U.S.C. 154(b) by 159 days.

(21) Appl. No.: 12/991,128

(22) PCT Filed: May 13, 2009

(86) PCT No.: PCT/SE2009/050538
§ 371 (c)(1),
(2), (4) Date: Nov. 29, 2010

(87) PCT Pub. No.: WO2009/139715
PCT Pub. Date: Nov. 19, 2009

(65) Prior Publication Data
US 2011/0058997 A1 Mar. 10, 2011

(30) Foreign Application Priority Data
May 13, 2008 (SE) ...................................... 0801080

(51) Int. Cl.
*C01G 3/04* (2006.01)
*C01G 37/00* (2006.01)

(52) U.S. Cl.
USPC ................. 423/46; 423/53; 423/138; 423/69; 423/21.1; 423/38

(58) Field of Classification Search
USPC ........................ 423/46, 53, 69, 138
See application file for complete search history.

(56) References Cited

U.S. PATENT DOCUMENTS

| | | | |
|---|---|---|---|
| 3,560,199 A | 2/1971 | Jonsson | |
| 3,880,650 A * | 4/1975 | Pemsler | 75/10.67 |
| 3,894,927 A * | 7/1975 | Kane et al. | 205/367 |
| 4,144,056 A | 3/1979 | Kruesi | |
| 4,179,492 A | 12/1979 | Kruesi | |
| 4,209,501 A | 6/1980 | Kruesi | |
| 4,220,629 A * | 9/1980 | Wyndham et al. | 423/76 |
| 4,475,993 A | 10/1984 | Blander | |
| 4,576,812 A | 3/1986 | von Hahn | |
| 4,762,694 A * | 8/1988 | Maroni et al. | 423/50 |
| 5,074,910 A * | 12/1991 | Dubrovsky | 75/637 |
| 6,274,104 B1 | 8/2001 | Rastas | |

FOREIGN PATENT DOCUMENTS

| | | | |
|---|---|---|---|
| GB | 1471009 | | 7/1974 |
| GB | 1398558 A | | 6/1975 |
| GB | 2067599 | | 7/1981 |
| JP | 60141818 A | * | 7/1985 |
| JP | 2002 | | 6/2001 |
| JP | 2006028622 A | * | 2/2006 |
| SE | 381862 | | 6/1975 |

OTHER PUBLICATIONS

International Search Report mailed Aug. 28, 2009 and Written Opinion Aug. 24, 2009 in parent PCT application.
S. Von Winbush and V.A. Maroni in Separation Science and Technology vol. 22 (2&3) pp. 1135-1148 (1987).

* cited by examiner

*Primary Examiner* — Melissa Stalder

(74) *Attorney, Agent, or Firm* — Jeffrey S. Melcher; Manelli Selter PLLC

(57) ABSTRACT

A process for chlorinating ore, slag, mill scale, scrap, dust and other resources containing recoverable metals from the groups 4-6, 8-12, and 14 in the periodic table. The process comprises: a) forming a liquid fused salt melt consisting essentially of aluminum chloride and at least one other metal chloride selected from the group consisting of alkali metal chlorides and alkaline earth metal chlorides, wherein the aluminum chloride content in the liquid salt melt exceeds 10% by weight; b) introducing the recoverable metal resources into said liquid salt melt: c) reacting the aluminum chloride as chlorine donor with said recoverable metal resource to form metal chlorides, which are dissolved in the salt melt; and d) recovering the formed metal chlorides from the salt melt.

23 Claims, No Drawings

US 8,470,271 B2

PROCESS FOR CHLORINATING RESOURCES CONTAINING RECOVERABLE METALS

CROSS-REFERENCE TO RELATED APPLICATIONS

This application is a national stage entry under 35 U.S.C. 371 of International Application No. PCT/SE2009/050538, filed 13 May 2009, designating the United States. This application claims foreign priority under 35 U.S.C. 119 and 365 to Swedish Patent Application No. 0801080-3, filed 13 May 2008. The complete contents of these applications are incorporated herein by reference.

TECHNICAL FIELD

The present invention relates to a process for chlorinating ore, slag, mill scale, scrap, dust and other resources containing recoverable metals from the groups 4-6, 8-12, and 14 in the periodic table.

More precisely, the invention provides a process for the recovery of valuable metals primarily from:

Low grade ores.
Sulfide ores.
Ocean floor nodule ores.
Ores that are difficult to process with present technologies as the valuable metals are bounded to silicates e.g. laterite ores containing nickel or cobalt.
Process slag from the metallurgical industry. Slag from primarily steel plants producing high alloyed steels, such as tool steels and stainless steels, contains appreciable amounts of valuable metals, such as chromium, nickel, molybdenum, vanadium, cobalt and tungsten. This slag is presently dumped, which is an environmentally unsuitable method and a waste of valuable and limited resources.
Mill scale obtained at hot forming of high alloyed steels, such as tool steels, high-speed steels and stainless steels.
Scrap containing valuable elemental metals, e.g. of cemented carbide containing more than 70% by weight of tungsten. "Cemented carbide", also called hardmetal, is a metal matrix composite where tungsten carbide particles are the aggregate and metallic cobalt serves as the matrix.
Dust from steel production having a combined amount of chromium and nickel of more than 5% by weight.

BACKGROUND ART

It is of large importance to recover important base metals more effectively from resources regarded as secondary ones, such as slag, low or medium grade ores, mill scale and scrap. Further, there are important mineral deposits that are not processed due to the inherent difficulties to technically and economically concentrate and extract the valuable metals in these deposits. One example of deposits, which are difficult to process and exploit, is laterites containing nickel or cobalt, in which the nickel and cobalt partly are bound and finely dispersed in silicates.

For many years, chlorination has been considered an effective process for recovering metal values from ores, slag, scrap and other material. Chloride process metallurgy is of large industrial importance in the production of titanium and zirconium metal.

U.S. Pat. No. 4,144,056 discloses a process for recovering nickel, manganese and cobalt from e.g. silicate ores, such as laterites, by heating the ore in an chloride melt containing ferric chloride and ammonium chloride or alkali chloride, such as sodium chloride. The nickel in the laterite ores is present both as nickel oxide and as nickel oxide in the silicate phase. The oxides of nickel, manganese and cobalt present in the laterite ore react in the salt melt with the ferric chloride under formation of iron oxide and dichlorides of nickel, manganese, and cobalt. The nickel, manganese, and cobalt chlorides are then leached with water and recovered.

Ocean-floor nodules are potentially the most important valuable source of industrial metals, such as copper, nickel, cobalt and manganese. U.S. Pat. No. 4,144,056 describes also the recovery of these valuable metals from sea nodules by reacting ground nodules with ferric chloride and sodium chloride at 420° C. The salt melt with the added sea nodules was subsequently cooled and water leached, whereby the manganese, cobalt, copper and nickel was recovered.

Extraction of cobalt, copper, iron, manganese and iron from Pacific Ocean deep sea nodules using chloride salt melts has also been reported by S. Von Winbush and V. A. Maroni in Separation Science and Technology Volume 22 (2&3) pp. 1135-1148 (1987) and U.S. Pat. No. 4,762,694. These authors report that preferred salt melts were eutectics of LiCl, NaCl, KCl, and $MgCl_2$ with the eutectic temperature at or below about 400° C. The transition metals were subsequently recovered by distillation, electrolytic deposition, and by oxidation and precipitation as an oxide.

In U.S. Pat. No. 4,179,492, a process is disclosed, where rare earth metal oxides are chlorinated in a salt melt comprising ferric chloride and at least one other chloride from the group consisting of alkali metal chlorides, alkaline earth metal chlorides, zinc chloride and ammonium chloride.

Chlorination of sulfide ores of lead, zinc, copper, silver and gold is disclosed in U.S. Pat. No. 4,209,501 and is carried out by a process comprising reaction of the sulfide ore in salt melts. This consists of at least two different chlorides with one chloride comprising 15% by weight and being selected from the group consisting of ferric chloride, ferrous chloride, cupric chloride, cuprous chloride and mixtures thereof, and at least one other chloride from the group consisting of alkali metal chlorides, alkaline earth metal chlorides, zinc chloride and ammonium chloride. It is further mentioned in U.S. Pat. No. 4,209,501 that chlorine gas or sulfur chloride may be introduced in the salt melt as chlorine donor.

U.S. Pat. No. 5,074,910 discloses the recovery of precious metals from sulfide ores by chlorination in a salt melt of potassium chloride and cuprous chloride. The reaction is carried out in the temperature range 300° C. to 600° C.

In U.S. Pat. No. 4,576,812, a process is disclosed for making chlorides from sulfides of copper, iron, lead, zinc, silver and gold by chlorination in ferric chloride, cupric chloride or a mixture of ferric and cupric chloride. The metal sulfides are recovered as metal chlorides and elemental sulfur.

SE 381 862 describes a chlorination process for the high temperature metals titanium, silicon, vanadium, niobium, tantalum, tungsten and molybdenum, or alloys that contain these metals. The chlorination is carried out in a salt melt containing sodium chloride and/or potassium chloride and in addition chlorides of iron, copper and chromium. Characteristic of this process is that liquid chlorine is added to the salt melt.

U.S. Pat. No. 6,274,104 B1 discloses a method for recovering non-ferrous metals, particularly nickel, cobalt, copper, zinc, manganese and magnesium, from materials containing said metals by converting said non-ferrous metals into sulfates by means of melt and melt coating sulfation, i.e. by a thermal treatment under oxidizing conditions within a temperature range of 400 to 800° C., during which a reaction mixture is formed containing at least one said non-ferrous metal, iron(III)sulfate and alkali metal sulfate, and appropriate reaction conditions are selected to substantially prevent iron(III)sulfate from thermally decomposing to hematite, and finally, said non-ferrous metals are recovered as metallic compounds.

A process for recovering precious metals from sulfide ores is disclosed in U.S. Pat. No. 5,074,910. The process involves chlorinating a mixture of an ore concentrate and salt to form a liquid melt. The salt preferably contains potassium chloride. This chlorination is carried out at a temperature between 300° C. and 600° C. while stirring. The process converts precious metals in the elemental and sulfide forms into precious metal chlorides which are recovered by subsequent processing steps.

GB 1 471 009 discloses a process for recovering a base metal, i.e. manganese, iron, cobalt, nickel, copper, zinc, tin, or lead, dissolved as a chloride in molten salt comprising an alkali metal or alkaline earth metal chloride or mixture of such chlorides, in a process in which the base metal values are precipitated by means of hydrogen, hydrogen sulfide or both and are separated as a liquid phase from the molten salt.

JP 2002-372518 discloses that platinum group elements (ruthenium, osmium, iridium and rhodium) in a sample can be determined by placing the sample in a crucible together with nickel powder, sulfur powder, sodium carbonate, borax and silica sand, mixing the ingredients in the crucible, heating them to melt, and then cooling the melt to obtain a nickel sulfide button, which then is used for determining the platinum group elements.

U.S. Pat. No. 4,475,993 describes treatment of fine grained industrial fly ash having a silicate base to recover valuable trace metals such as gallium, silver and the like in concentrations less than about 1 wt %. The fly ash is contacted with $AlCl_3$ in an alkali halide melt. Example 1 discloses a dosage of $AlCl_3$ of about one mole % and an attack of the silicate base should be avoided.

A process for recovery of platinum group metals (PGMs) from refractory ceramic substrates containing an aluminum silicate and/or alumina, for example, wash-coated auto emission control catalysts and Pt reforming catalysts is disclosed in GB 2 067 599 A. To carry out the process, a charge, in divided form, containing the substrate, one or more fluxes and a collector material is heated in a high intensity furnace, preferably of the plasma arc type, to a temperature of at least 1420° C. to produce a molten metallic phase including a substantial proportion of said metals and a molten slag phase. These are then separated and the platinum group metals subsequently extracted from the metallic phase. The preferred fluxes are selected from $CaO$, $CaF_2$, $BaO$, $Fe_2O_3$, $MgO$, $SiO_2$ and $TiO_2$, and the preferred collector material is selected from Fe, Ni, Cu, Co, Pb, Zn, and Al or mixtures thereof.

Pure metals, alloys, oxides, sulfides, carbonates and silicates react in molten chloride salt melts with chlorine and chlorine donors such as ferric chloride and cupric chloride under the formation of metal chlorides. However, the present state of the art related to chlorination of metal resources suffers sometimes from low reaction rates and low yield of valuable metals that prevail in the ore that is chlorinated in the salt melt.

Thus, it is well known that metal values can be recovered from many sources such as scrap, ores and sea nodules by chlorination. The formed metal chlorides can subsequently be separated and extracted by fractional distillation and condensation, electrolysis of the salt or by hydrometallurgical processing.

There are three groups of chlorination processes:
a) Chlorination of solid raw materials such as sulfide, silicate and oxide ores as well as ocean floor nodules by gaseous chlorine.
b) Chlorination of ores, scrap, mill scale, dust etc. in salt melts in the absence of chlorine. Here, ferric chloride and/or cupric chloride are commonly used chlorine donors.
c) The same as b) but in the presence of elemental chlorine, which can be added as chlorine gas or liquid chlorine.

However, in prior art chlorination processes of the b) kind, the reaction rate and mostly also the yield of valuable metals are unacceptably low.

DISCLOSURE OF THE INVENTION

The main object of the present invention is to provide a chlorination process having a considerably higher reaction rate and yield of valuable metals.

This object is achieved in a process of the kind referred to in the first paragraph above and in accordance with the present invention by:
a) forming a liquid fused salt melt consisting essentially of aluminum chloride and at least one other metal chloride selected from the group consisting of alkali metal chlorides and alkaline earth metal chlorides, wherein the aluminum chloride content in the liquid salt melt exceeds 10% by weight;
b) introducing said recoverable metal resources into said liquid salt melt:
c) reacting the aluminum chloride as chlorine donor with said recoverable metal resource to form metal chlorides, which are dissolved in the salt melt; and
d) recovering the formed metal chlorides from the salt melt.

It has surprisingly been found that aluminum chloride ($AlCl_3$) dissolved in a melt of at least one other metal chloride selected from the group consisting of alkali metal chlorides and alkaline earth metal chlorides is a most effective chlorine donor in the chlorination process. The increased effectiveness results in increased reaction rates and higher yields, and it has surprisingly been found that both the reaction rate and the yield of valuable metals are very high when metal resources such as ore, scrap, mill scale and dust are chlorinated according to the present invention. It is of decisive importance in extractive processing of ores, scrap and by-products that the reaction rates are high, which reduces the processing time and increases the production rate. In addition, it is very important that the yield of valuable metals is very high. Low reaction rate leads to low productivity and directly to increased production costs. Low yield gives a loss of valuable resources and often also has a negative impact on the environment.

In a first embodiment of the invention, the metal containing resource is sulfide ore. Then, it is advantageous to include a further process step, viz. obtaining as elemental sulfur the sulfur present in the sulfide ore. The possibility of recovering sulfur in elemental form from a sulfide is extremely positive for the environment, especially in the production of metals like copper and nickel.

In a second embodiment, the metal containing resource is an ocean floor nodule ore.

In a third embodiment, the metal containing resource is mill scale of high alloyed tool steel, high speed steel or stainless steel.

In a fourth embodiment, the metal containing resource is cemented carbide containing more than 70% by weight of tungsten.

In a fifth embodiment, the metal containing resource is dust that has a combined amount of chromium and nickel of more than 5% by weight.

In a seventh embodiment, the metal containing resource is sulfide ore, slag, mill scale of high alloyed tool steel, high speed steel or stainless steel, cemented carbide containing more than 70% by weight of tungsten, or dust having a combined amount of chromium and nickel of more than 5% by weight, said process further comprising adding gaseous carbon dioxide to the salt melt during the chlorination process. Thereby, the extraction is made more effective.

In an eighth embodiment, the metal containing resource is sulfide ore, ocean floor nodule ore, slag or mill scale of high alloyed tool steel, high speed steel or stainless steel, said process further comprising adding (to the recoverable metal resources) more than 10% of a boron containing compound selected from the group consisting of boric acid and sodium borate. Thereby, the extraction is made more effective.

Preferably, the salts of the liquid salt melt consist essentially of aluminum chloride, sodium chloride and potassium chloride.

Preferably, the aluminum chloride content in the liquid salt melt is in the range of 10-60% by weight, more preferably 15-40 wt %.

Preferably, the chlorination reaction is carried out under protective atmosphere. The atmosphere can e.g. be nitrogen and/or argon or chlorine gas or a mixture of chlorine and at least one of nitrogen and argon.

Further, the ore, scrap, slag, mill scale or dust is preferably dehydrated before being added to the salt melt. It is also advantageous to mill the ore and the other metal containing products to fine powder before they are introduced and mixed with the molten salt. The metal chlorides formed at the chlorination process are soluble in the salt melt and can be subsequently be extracted and recovered by electrolysis, vaporization, fractional distillation and condensation or by hydrometallurgical processes.

MODE(S) FOR CARRYING OUT THE INVENTION

The present invention provides a new process for chlorinating ore, slag, mill scale, scrap, dust and other resources containing recoverable metals from the groups 4-6, 8-12, and 14 in the periodic table.

The new process comprises:
a) forming a liquid fused salt melt consisting essentially of aluminum chloride and at least one other metal chloride selected from the group consisting of alkali metal chlorides and alkaline earth metal chlorides, wherein the aluminum chloride content in the liquid salt melt exceeds 10% by weight;
b) introducing said recoverable metal resources into said liquid salt melt;
c) reacting the aluminum chloride as chlorine donor with said recoverable metal resource to form metal chlorides, which are dissolved in the salt melt; and
d) recovering the formed metal chlorides from the salt melt.

It has surprisingly been found that aluminum chloride ($AlCl_3$) dissolved in a melt of at least one other metal chloride selected from the group consisting of alkali metal chlorides and alkaline earth metal chlorides is a most effective chlorine donor in the chlorination process. The increased effectiveness results in increased reaction rates and higher yields, and it has surprisingly been found that both the reaction rate and the yield of valuable metals are very high when metal resources such as ore, scrap, slag, mill scale and dust are chlorinated according to the present invention. It is of decisive importance in extractive processing of ores, scrap and by-products that the reaction rates are high, which reduces the processing time and increases the production rate. In addition, it is very important that the yield of valuable metals is very high. Low reaction rate leads to low productivity and directly to increased production costs. Low yield gives a loss of valuable resources and often also has a negative impact on the environment.

The purpose of the other metal chlorides in the salt melt is to be a solvent for the aluminum chloride and they remain stable during the process, while the aluminum chloride is the chloride donor.

In a first embodiment of the invention, the metal containing resource is sulfide ore. Then, it is advantageous to include a further process step, viz. obtaining as elemental sulfur the sulfur present in the sulfide ore. The possibility of recovering sulfur in elemental form from a sulfide is extremely positive for the environment, especially in the production of metals like copper and nickel. Preferably the sulfide ore includes at least one metal chosen from the group Cu, Mo, Fe, Zn, Ni, Co; in a total content of at least 0.5% by weight In a second embodiment, the resource containing recoverable metals is ocean floor nodule ore. Preferably, the ocean floor nodule ore includes at least one metal chosen from the group Mn, Fe, Ni, Co, Cu, Pb, V, Cr, rare earth metals; in a total content of at least 1% by weight.

In a third embodiment, the metal containing resource is mill scale of high alloyed tool steel, high speed steel or stainless steel. Preferably, the mill scale includes at least one metal chosen from the group Fe, Ni, Cr, V, Co, W, Mo; in a total content of at least 2% by weight.

In a fourth embodiment, the metal containing resource is cemented carbide containing more than 70% by weight of tungsten.

In a fifth embodiment, the metal containing resource is dust that has a combined amount of chromium and nickel of more than 5% by weight.

In a seventh embodiment, the metal containing resource is sulfide ore, slag, mill scale of high alloyed tool steel, high speed steel or stainless steel, cemented carbide containing more than 70% by weight of tungsten, or dust having a combined amount of chromium and nickel of more than 5% by weight, said process further comprising adding gaseous carbon dioxide to the salt melt during the chlorination process. Thereby, the extraction is made more effective.

In an eighth embodiment, the metal containing resource is sulfide ore, ocean floor nodule ore, slag or mill scale of high alloyed tool steel, high speed steel or stainless steel, said process further comprising adding (to the recoverable metal resources) more than 10% of a boron containing compound selected from the group consisting of boric acid and sodium borate. Thereby, the extraction is made more effective.

Raw Materials Containing Oxides (Ores, Slag, Mill Scales, Dust):

This category includes oxides scales from steel manufacturing, ores and slag with oxides embedded in silicate structures. In particular ores and slag where the metal oxides are embedded in silicate structures are normally very difficult to extract. However, aluminum chloride has been found to break apart the silicate structures and selectively remove the metals from the silicate structure, enabling an economically viable recovery of metals from such slag and ores. For instance slag from electric furnaces may have high contents of metals (e.g. chromium as high as 7 wt %) that are embedded in very strong silicate structures and have thus been difficult to extract.

However, the inventive use of aluminum chloride to attack the silicate structures enables recovery of metals even from this kind of slag.

For some of the most valuable and recoverable metals oxides, the reactions in the salt melt are as follows:

$$3CuO + 2AlCl_3 \rightarrow 3CuCl_2 + Al_2O_3 \quad (1)$$

$$3CoO + 2AlCl_3 \rightarrow 3CoCl_2 + Al_2O_3 \quad (2)$$

$$3NiO + 2AlCl_3 \rightarrow 3NiCl_2 + Al_2O_3 \quad (3)$$

$$Fe_2O_3 + 2AlCl_3 \rightarrow 2FeCl_3 + Al_2O_3 \quad (4)$$

$$3ZnO + 2AlCl_3 \rightarrow 3ZnCl_2 + Al_2O_3 \quad (5)$$

$$Cr_2O_3 + 2AlCl_3 \rightarrow 2CrCl_3 + Al_2O_3 \quad (6)$$

Raw Materials Containing Sulfides (Ores), e.g. Chalcopyrite and Sphalerite or Wurtzite:

When reacting sulfides in accordance with the present invention, we have found that carbon dioxide should be added to the salt melt in order to prevent the elemental sulphur produced from further oxidation to $SO_2$ apart from providing oxygen for selective oxidation of $AlCl_3$ to $Al_2O_3$ under controlled oxygen partial pressure. Below are examples of reactions with sulfide ores containing Cu, Fe and Zn.

$$6CuFeS_2 + 10AlCl_3 + 15CO_2 \rightarrow 6CuCl_2 + 6FeCl_3 + 5Al_2O_3 + 15CO + 12S^0 \quad (7)$$

where $S^0$ designates elemental sulfur.

$$3ZnS + 2AlCl_3 + 3CO_2 \rightarrow 3ZnCl_2 + Al_2O_3 + 3CO + 3S^0 \quad (8)$$

However other metals from sulfides ores including molybdenum, nickel and cobalt can also be extracted by chlorinating with $AlCl_3$. It should also be noted that the possibility of recovering sulfur in elemental form from a sulfide is extremely positive for the environment, especially in the production of metals like copper and nickel.

Raw Materials Containing Metals in the Elemental Form (Scrap, Dust, Alloys):

When reacting elemental metals in accordance with the present invention, we have found that carbon dioxide should be added to the salt melt in order to provide oxygen under controlled oxygen partial pressure. Below are examples of reactions formulae for elemental metals.

$$W + 2AlCl_3 + 6CO_2 \rightarrow WCl_6 + Al_2O_3 + 6CO \quad (9)$$

$$6Mo + 10AlCl_3 + 15CO_2 \rightarrow 6MoCl_5 + 5Al_2O_3 + 15CO \quad (10)$$

$$3Ni + 2AlCl_3 + 3CO_2 \rightarrow 3NiCl_2 + Al_2O_3 + 3CO \quad (11)$$

Raw Materials Containing Carbides e.g. Hard Metal Scrap:

When carbides in accordance with the present invention, we have found that carbon dioxide should be added to the salt melt in order to control the oxygen partial pressure. Below are examples of reactions formulae for carbide containing raw material.

$$WC + 2AlCl_3 + 4CO_2 \rightarrow WCl_6 + Al_2O_3 + 5CO \quad (12)$$

$$6MoC + 10AlCl_3 + 21CO_2 \rightarrow 6MoCl_5 + 5Al_2O_3 + 27CO \quad (13)$$

However other carbides such as cobalt and tantalum carbide can also be extracted by chlorinating with $AlCl_3$.

Preferably, the salts of the liquid salt melt consist essentially of aluminum chloride, sodium chloride and potassium chloride.

Preferably, the aluminum chloride content in the liquid salt melt is in the range of 10-60% by weight, more preferably 15-40 wt %.

Further, the ore, scrap, slag, mill scale or dust is preferably dehydrated before it is added to the salt melt. It is also advantageous to mill the ore and the other metal containing products to fine powder before they are introduced and mixed with the molten salt. Preferably the particles are milled to a fine powder having D90<2 mm, more preferably D90<1 mm. The finer the particles are, the higher the reaction rate.

In an alternative embodiment the average particles size are in the range 50-1500 μm, preferably 100-1000 μm, more preferably 200-500 μm. The aluminum chloride has been shown to be very effective, and it is therefore possible to extract metals from powder with comparably large particle sizes. Allowing a comparably large average size of the powder reduces the milling costs.

The metal chlorides formed at the chlorination process are soluble in the salt melt and can be subsequently be extracted and recovered by electrolysis, vaporization, fractional distillation and condensation or by hydrometallurgical processes.

EXAMPLE 1

A salt melt was prepared by melting 35 parts by weight of NaCl, 43 parts by weight of KCl and 22 parts by weight of $AlCl_3$ in an alumina crucible and heated to 970° C. 15 parts by weight of dehydrated slag from tool steel production was ground to powder with a particle size that was 100% finer than 100 μm and was added to the salt melt at this temperature. The slag had the following composition by weight:

CaO 30.5%, MgO 17.2%, $Al_2O_3$, 5% $SiO_2$ 36.1%, FeO 2.4%, MnO 1.8% and $Cr_2O_3$ 8%.

The reaction time between the salt melt and the slag was 45 minutes, after which the crucible with salt melt and slag was cooled to room temperature. It was found that 88% of the chromium in the slag phase was chlorinated and thus transferred to the chloride phase. The experiment was carried out in a closed system under a protective atmosphere of nitrogen.

As reference, the above experiment was repeated in such a way that the aluminum chloride was substituted with either 22 parts by weight of ferric chloride, ferrous chloride, cupric chloride or cuprous chloride. All other conditions were the same. The recovered amounts of chromium from the slag were in these 4 experiments in the range 8-13%, i.e. much lower compared to when aluminum chloride was used in the salt melt.

EXAMPLE 2

A parallel experiment was carried out on the tool steel slag with the same composition and particle size distribution as in example. The salt melt had the same composition and temperature as in example 1. The only difference was that 5 parts by weight of boric acid was mixed with the slag and this mixture was subsequently added to the salt melt that was contained in the alumina crucible. All other experimental conditions were the same as those in Example 1.

It was found that the yield of chromium rose to 97.5% as a result of the boric acid addition.

EXAMPLE 3

Chalcopyrite ($CuFeS_2$) ore was mixed with a salt mixture containing equal amounts NaCl and KCl. 30 parts by weight of $AlCl_3$ was added. The mixture was melted under $CO_2$ atmosphere in order to control the oxygen partial pressure in the gas phase and kept at 850° C. The molten salt was electrolyzed. A cathode voltage of 5 V was applied. The cathode was found to have Cu as well as Cu—Fe deposits after 2 h of electrolysis.

EXAMPLE 4

A salt melt was prepared by melting 35 parts by weight of NaCl, 43 parts by weight of KCl and 22 parts by weight of $AlCl_3$ in an alumina crucible and then the salt melt was heated to 670° C. Crushed cemented carbide scrap with a particle size less than 2 mm in size was added to the salt melt and reacted during 2 hours, while carbon dioxide gas was blown into the salt melt. The cemented carbide scrap consisted mainly of used cutting tools and contained cobalt as well as tungsten carbide, tantalum carbide and some molybdenum carbide. The chlorinated products tungsten hexachloride, tantalum pentachloride and molybdenum pentachloride were continuously evaporated from the salt melt and collected by condensation in a separate cooled (100° C.) stainless steel chamber. The yield of these three refractory metals was higher than 95%. The cobalt matrix phase in the cemented carbide was also chlorinated but collected in the salt melt due to its lower vapor pressure. Cobalt was subsequently extracted from the salt melt by dissolving this melt in water and exposing the water solution to electrolysis. The yield of the cobalt from the cemented carbide scrap was 92% measured as deposit on the cathode electrode.

EXAMPLE 5

Ni-containing ore was mixed with a salt mixture containing equal amounts NaCl and KCl. 30 parts by weight of $AlCl_3$ was added. The mixture was melted under $CO_2$ atmosphere in order to control the oxygen partial pressure in the gas phase and kept at 850° C. The molten salt was electrolyzed. A cathode voltage of 5 V was applied. The cathode was found to have Ni deposit after 3 h of electrolysis.

EXAMPLE 6

A salt mixture containing equal amounts of NaCl and KCl was mixed with titanium oxide (anatase) and 30% by weight of $AlCl_3$. The salt melt was kept molten at 900° C. for 4 h. The melt was quenched in distilled water and the contents were analyzed for Ti. 45% of titanium was found in the leached phase.

INDUSTRIAL APPLICABILITY

The chlorinating process of the present invention is useful for the recovery of valuable metals primarily from:
Low grade ores.
Sulfide ores.
Ocean floor nodule ores.
Ores that are difficult to process with present technologies as the valuable metals are bounded to silicates e.g. laterite ores containing nickel or cobalt.
Process slag from the metallurgical industry. Slag from primarily steel plants producing high alloyed steels, such as tool steels and stainless steels, contains appreciable amounts of valuable metals, such as chromium, nickel, molybdenum, vanadium, cobalt and tungsten. This slag is presently dumped, which is an environmentally unsuitable method and a waste of valuable and limited resources.
Mill scale obtained at hot forming of high alloyed steels, such as tool steels, high-speed steels and stainless steels.
Scrap containing valuable elemental metals, e.g. scrap from cemented carbide containing more than 70% by weight of tungsten. "Cemented carbide", also called hardmetal, is a metal matrix composite where tungsten carbide particles are the aggregate and metallic cobalt serves as the matrix.
Dust having a combined amount of chromium and nickel of more than 5% by weight.

The invention claimed is:

1. A process for chlorinating ore, slag, mill scale, scrap, dust and other resources containing recoverable metals from the groups 4-6, 8-12, and 14 in the periodic table, said process comprising:
   a) forming a liquid fused salt melt consisting essentially of aluminum chloride and at least one other metal chloride selected from the group consisting of alkali metal chlorides and alkaline earth metal chlorides, wherein the aluminum chloride content in the liquid salt melt is at least 10% by weight;
   b) introducing said recoverable metal resources into said liquid salt melt;
   c) reacting the aluminum chloride as chlorine donor with said recoverable metal resource to form metal chlorides, which are dissolved in the salt melt; and
   d) recovering the formed metal chlorides from the salt melt.

2. The process according to claim 1, wherein the metal containing resource is a sulfide ore.

3. The process according to claim 2, wherein the sulfide ore includes at least one metal chosen from the group Cu, Mo, Fe, Zn, Ni, Co; in a total content of at least 0.5% by weight.

4. The process according to claim 1, wherein the metal containing resource is ocean floor nodule ore.

5. The process according to claim 4, wherein the ocean floor nodule ore includes at least one metal chosen from the group Mn, Fe, Ni, Co, Cu, Pb, V, Cr, rare earth metals; in a total content of at least 1% by weight.

6. The process according to claim 1, wherein the metal containing resource is mill scale of high alloyed tool steel, high speed steel or stainless steel.

7. The process according to claim 1, wherein the mill scale includes at least one metal chosen from the group Fe, Ni, Cr, V, Co, W, Mo; in a total content of at least 2% by weight.

8. The process according to claim 1, wherein the metal containing resource is cemented carbide containing more than 70% by weight of tungsten.

9. The process according to claim 1, wherein the metal containing resource is dust that has a combined amount of chromium and nickel of more than 5% by weight.

10. The process according to claim 1, wherein the metal containing resource is sulfide ore, slag mill scale of high alloyed tool steel, high speed steel or stainless steel, cemented carbide containing more than 70% by weight of tungsten, or dust having a combined amount of chromium and nickel of more than 5% by weight, said process further comprising adding gaseous carbon dioxide to the salt melt during the chlorination process.

11. The process according to claim 1, wherein the metal containing resource is sulfide ore, ocean floor nodule ore, slag, or mill scale of high alloyed tool steel, high speed steel or stainless steel, said process further comprising adding (to the recoverable metal resources) more than 10% of a boron containing compound selected from the group consisting of boric acid and sodium borate.

12. The process according to claim 2, further comprising obtaining as elemental sulfur the sulfur present in the sulfide ore.

13. The process according to claim 1, wherein the salts of the liquid salt melt consist essentially of aluminum chloride, sodium chloride and potassium chloride.

14. The process according to claim 1, wherein the aluminum chloride content in the liquid salt melt is in the range of 10-60% by weight.

15. The process according to claim 1, further comprising carrying out the chlorination reaction under protective atmosphere.

16. The process according to claim 15, wherein the protective atmosphere is nitrogen and/or argon.

17. The process according to claim 13, wherein the protective atmosphere is chlorine gas or a mixture of chlorine and at least one of nitrogen and argon.

18. The process according to claim 1, further comprising milling the metal containing resource to fine powder before introducing and mixing it with the molten salt.

19. The process according to claim 18, wherein D90 is less than 2 mm.

20. The process according to claim 1, further comprising dehydrating the metal containing resource before introducing and mixing it with the molten salt.

21. The process according to claim 1, further comprising performing the chlorination of the recoverable metal within a temperature range of 150° C. to 1000° C.

22. The process according to claim 1, further comprising performing the chlorination of the recoverable metal within a temperature above 600° C.

23. The process according to claim 1, wherein the aluminum chloride content in the liquid salt melt is in the range of 15-40 wt %.

* * * * *